(12) United States Patent
Hammouche et al.

(10) Patent No.: US 11,417,931 B2
(45) Date of Patent: Aug. 16, 2022

(54) ENERGY STORAGE SYSTEM FOR A VEHICLE

(71) Applicant: Clarios Germany GmbH & Co. KGaA, Hannover (DE)

(72) Inventors: Abderrezak Hammouche, Hannover (DE); Bernhard Ehrlich, Neustadt am Ruebenberge (DE); Ruediger Jaeppelt, Hildesheim (DE); Stephan Andreas Goertler, Lehrte (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 0 days.

(21) Appl. No.: 16/612,278

(22) PCT Filed: May 11, 2018

(86) PCT No.: PCT/EP2018/062198
§ 371 (c)(1),
(2) Date: Nov. 8, 2019

(87) PCT Pub. No.: WO2018/206759
PCT Pub. Date: Nov. 15, 2018

(65) Prior Publication Data
US 2021/0159569 A1    May 27, 2021

(30) Foreign Application Priority Data
Nov. 5, 2017   (DE) .......................... 102017110218.3

(51) Int. Cl.
*H01M 50/317* (2021.01)
*H01M 50/308* (2021.01)
*H01M 10/12* (2006.01)

(52) U.S. Cl.
CPC ....... *H01M 50/317* (2021.01); *H01M 10/121* (2013.01); *H01M 50/308* (2021.01); *H01M 2220/20* (2013.01)

(58) Field of Classification Search
CPC ............ H01M 50/317; H01M 50/308; H01M 10/121; H01M 2220/20; H01M 50/30
See application file for complete search history.

(56) References Cited

U.S. PATENT DOCUMENTS 5,849,431 A * 12/1998 Kita .................. H01M 10/0431
429/164
7,547,487 B1   6/2009 Smith et al.
(Continued)

FOREIGN PATENT DOCUMENTS

DE   3444011 A1   6/1986
EP   0305822 A1   3/1989
EP   1059680 A1   12/2000

OTHER PUBLICATIONS

International Search Report of the International Search Authority, dated Aug. 20, 2018 for PCT/EP2018/062198 filed May 11, 2018, 12 pgs.

*Primary Examiner* — Maria Laios
*Assistant Examiner* — Adam J Francis
(74) *Attorney, Agent, or Firm* — Boardman & Clark LLP (57) ABSTRACT

The invention relates to an energy storage system for a vehicle, in particular a starter battery for a vehicle, having a plurality of energy storage cells for providing and/or storing electric energy and a housing which has a plurality of wall elements that delimit the interior of the housing. The housing is designed to receive the plurality of energy storage cells in the interior of the housing. A plurality of separating walls are arranged in the interior of the housing in order to divide the interior of the housing into a plurality of chambers, wherein each chamber is designed to receiving an (Continued)

energy storage cell. A fluidic connection is formed between the individual chambers, and a ventilation valve is arranged on one of the wall elements, preferably a cover element, of the housing in a respective region paired with the corresponding chamber. At least one of the ventilation valves is an active ventilation valve, and the remaining ventilation valves are blind closures.

20 Claims, 3 Drawing Sheets

(56) References Cited

U.S. PATENT DOCUMENTS

| | | | |
|---|---|---|---|
| 2002/0061434 A1 | 5/2002 | Holden et al. | |
| 2002/0177033 A1* | 11/2002 | Doyama | H01M 50/308 |
| | | | 429/72 |
| 2005/0147874 A1* | 7/2005 | Andersen | H01M 50/20 |
| | | | 429/86 |
| 2006/0166087 A1* | 7/2006 | Ogata | H01M 50/155 |
| | | | 429/153 |
| 2009/0068549 A1 | 3/2009 | Hamada et al. | |
| 2009/0169978 A1 | 7/2009 | Smith et al. | |
| 2015/0079427 A1* | 3/2015 | Chen | H01M 10/121 |
| | | | 429/54 |
| 2018/0183026 A1* | 6/2018 | Matsumoto | H01M 50/30 |
| 2018/0219761 A1* | 8/2018 | Kumar | H04L 43/18 |

* cited by examiner

ENERGY STORAGE SYSTEM FOR A VEHICLE

CROSS REFERENCE TO RELATED APPLICATIONS

This application is a National Stage Entry of PCT/EP2018/062198, filed May 11, 2018, entitled "ENERGY STORAGE SYSTEM FOR A VEHICLE," which claims priority to German Patent Application 10 2017 110 218.3, filed Nov. 5, 2017, entitled "ENERGY STORAGE SYSTEM FOR A VEHICLE".

The present application relates to an energy storage system for a vehicle, in particular to a starter battery for a vehicle.

As a general rule, 12 volt lead-acid batteries are usually used as starter batteries for vehicles. These are designed to start a drive unit in the form of an internal combustion engine and to maintain the function of the onboard electrical system; i.e. the starter battery provides the high current required when starting the vehicle. While the vehicle is traveling, the starter battery can furthermore supply voltage to an onboard electrical system of the vehicle and be charged.

The starter battery usually has a multiplicity of battery cells that are connected electrically together. However, the individual battery cells are individually sealed off from their surroundings and other battery cells for example via a cell housing.

On account of the electrochemical reactions that occur in the starter battery during a charging or overcharging process, a gas mixture made up at least of hydrogen, oxygen and carbon dioxide typically collects in an upper cell space or gas space. In a valve-regulated lead-acid battery, a considerable amount of oxygen can diffuse in the direction of negative electrode plates during operation and be subject to a recombination reaction forming water there; however, hydrogen and carbon dioxide cannot be so easily removed again.

Since the gas pressure in the gas space increases constantly, for safety reasons, each battery cell is conventionally equipped with a (dedicated) one-way valve, which opens whenever the gas pressure in the upper region of the cell space reaches a predetermined or predeterminable opening pressure.

After a particular quantity of gas has escaped, the gas pressure in the battery cell drops and the vent valve closes as soon as the gas pressure reaches a predetermined or predeterminable closing value.

It is assumed here that all battery cells have an identical or similar gas pressure and an identical or similar gas composition in their upper region. However, in practice, it can be established that the individual vent valves exhibit a significant variation in their manners of operation.

First, the actual opening and closing pressures of the vent valves often do not coincide with the predetermined or predeterminable values. Furthermore, the actual opening- and closing-pressure values change during the operation of the battery or during the lifetime of the battery, specifically as a result of aging of the vent valves, in particular under difficult and demanding conditions, for example with high temperatures, overcharging, and/or the occurrence of acid vapor.

Here, particular vent valves can even remain "virtually open" for a long time, resulting in a slower recombination process and greater water loss.

In short, such conventional energy storage systems thus have the drawback that the individual battery cells, at least after a certain operating time, no longer have the same or a similar gas pressure and an identical or similar gas composition, with the result that the performance of the individual battery cells can also worsen or change.

Moreover, as a result of such a configuration of a starter battery, it is even possible for individual cells to fail completely, with the result that, in the worst case, the starter battery is no longer capable of starting the vehicle or of supplying the onboard electrical system with energy.

Since, in such energy storage systems, the individual battery cells are configured such as to be separated from one another and sealed, such battery cells have to be tested for their cell-to-cell gas tightness, in particular before they are used.

Therefore, the invention is based on the object of providing an energy storage system that does not have the limitations of the prior art and can furthermore be produced more easily, quickly and cost-effectively. In addition, the energy storage system is intended to ensure increased quality and safety.

With regard to the energy storage system, the object on which the invention is based is achieved by the subject matter of independent claim 1. Further embodiments are set out in the dependent claims.

Therefore, according to the invention, an energy storage system for a vehicle, in particular a starter battery for a vehicle, is specified. The energy storage system has a multiplicity of energy storage cells for providing and/or storing electrical energy, and a housing that has a multiplicity of wall elements that bound an interior of the housing. In this case, the housing is configured to accommodate the multiplicity of energy storage cells in the interior of the housing. Furthermore, a multiplicity of dividing walls for subdividing the interior of the housing into a multiplicity of chambers are arranged in the interior of the housing. Each chamber is moreover configured to accommodate an energy storage cell, wherein a fluidic connection is formed between the individual chambers. In this case, a vent valve is arranged on one of the wall elements, preferably a cover element, of the housing in each case in a region assigned to a corresponding chamber, wherein at least one of the vent valves is an active vent valve and the rest of the vent valves are blind plugs.

The advantages of the invention are obvious. Firstly, product and production costs can be lowered, specifically, for the one part, by reducing the number of active vent valves that are required, and, for the other part, in that conventional housings can be developed or retrofitted easily by replacing the conventional (sealed) dividing walls with the dividing walls according to the invention, which are configured to allow a fluidic connection between the individual chambers, specifically without it being necessary to provide new production tools for the housing.

The reduction in the number of active vent valves is also accompanied by quicker manufacture of the energy storage system, since the production time for a vent valve, which is relatively complicated compared with a blind plug, is shorter, this at the same time also lowering the production costs.

Furthermore, time and costs can be saved because it is possible to dispense with the test for cell-to-cell tightness.

It is also possible, after the electrolyte has been fed to the energy storage cells, for all the energy storage cells to be evacuated equally. As a result, only one vacuum pump is now required rather—as previously conventional—one for each chamber, with the result that the production complexity can be kept low.

Furthermore, the battery quality can be improved, specifically in that, the formation of the fluidic connection between the individual chambers ensures that the individual energy storage cells are vented equally and thus at least substantially no quality differences can form in the individual energy storage cells on account of different gas pressures and/or gas compositions of the individual energy storage cells.

Moreover, it is also possible for the inspection costs and the inspection work to advantageously be reduced, specifically in that, for safety purposes, it is now necessary to check the gas pressure, the gas composition and/or the gas flow of only one space, rather than the gas pressure, the gas composition and/or the gas flow of each individual energy storage cell as in conventional energy storage systems. Therefore, safety issues related to gas management can be handled better when only one active vent valve or two active vent valves are present compared with when—as in conventional energy storage systems—each energy storage cell has a dedicated vent valve.

These and further advantageous effects can also be found in the dependent claims.

According to one further aspect of the invention, at least one of the vent valves is in the form of a blind plug.

According to one further aspect of the invention, exactly one active vent valve is arranged on the one wall element, in particular on the cover element, of the housing, specifically preferably such that the active vent valve is assigned to a chamber that is arranged in a central region of the interior of the housing.

According to one further aspect of the invention, two active vent valves are arranged on the one wall element, in particular on the cover element, of the housing, specifically preferably such that the two active vent valves are assigned to two chambers that are separated from one another via at least one (further) chamber that is assigned a blind plug.

According to one further aspect of the invention, each dividing wall has at least one opening for forming the fluidic connection between the individual chambers.

According to one further aspect of the invention, at least one of the multiplicity of dividing walls, in particular all of the dividing walls, has/have in each case exactly one opening in an upper region of the particular dividing wall.

According to one further aspect of the invention, the one opening per dividing wall is arranged such that at least two adjacent dividing walls have the opening in an offset manner, in particular in an alternately offset manner, specifically preferably in an upper end region or in one of two upper corner regions of the dividing walls.

According to one further aspect of the invention, at least one dividing wall, in particular all of the dividing walls, has/have an opening in an upper, central region of the particular dividing wall.

According to one further aspect of the invention, at least one of the multiplicity of dividing walls, in particular all of the dividing walls, has/have in each case exactly two openings in an upper region of the particular dividing wall, wherein the two openings are preferably arranged in each case in two upper end regions or in two upper corner regions of the corresponding dividing wall.

According to one further aspect of the invention, a membrane is formed in at least one of the openings, in particular in each opening.

According to one further aspect of the invention, the active vent valve is in the form of a one-way valve with a predetermined or predeterminable venting pressure, wherein the one-way valve is in this case integrated preferably into a vent plug.

According to one further aspect of the invention, the blind plugs are in the form of vent plugs, which are configured to seal off the interior of the housing.

According to one further aspect of the invention, the energy storage system is a lead-acid battery.

According to one further aspect of the invention, the energy storage system is in the form of a valve-regulated lead-acid battery, in particular of a valve-regulated absorbent glass mat (AGM) lead-acid battery.

The invention is described in more detail below, including with regard to further features and advantages, on the basis of the description of embodiments with reference to the accompanying drawings.

The energy storage system according to the invention is described in greater detail below with reference to the illustrations in the figures. Here, identical or equivalent elements and functions are provided with the same or similar reference signs.

Energy storage systems 100 that are configured to start an internal combustion engine of a vehicle 200 are generally referred to as starter batteries. Such starter batteries are usually based on lead-acid technology. However, it is equally conceivable for other energy storage system technologies to be used. For example, it is also conceivable to use a starter battery that is based on lithium-ion technology, nickel-metal hydride technology or nickel-cadmium technology.

The energy storage system 100 is described in the following text in such a way that relative terms refer to the installed state of the energy storage system 100. Thus, for example, "in an upper region" means in an upper region as seen in the installed state, etc.

Figure 1:
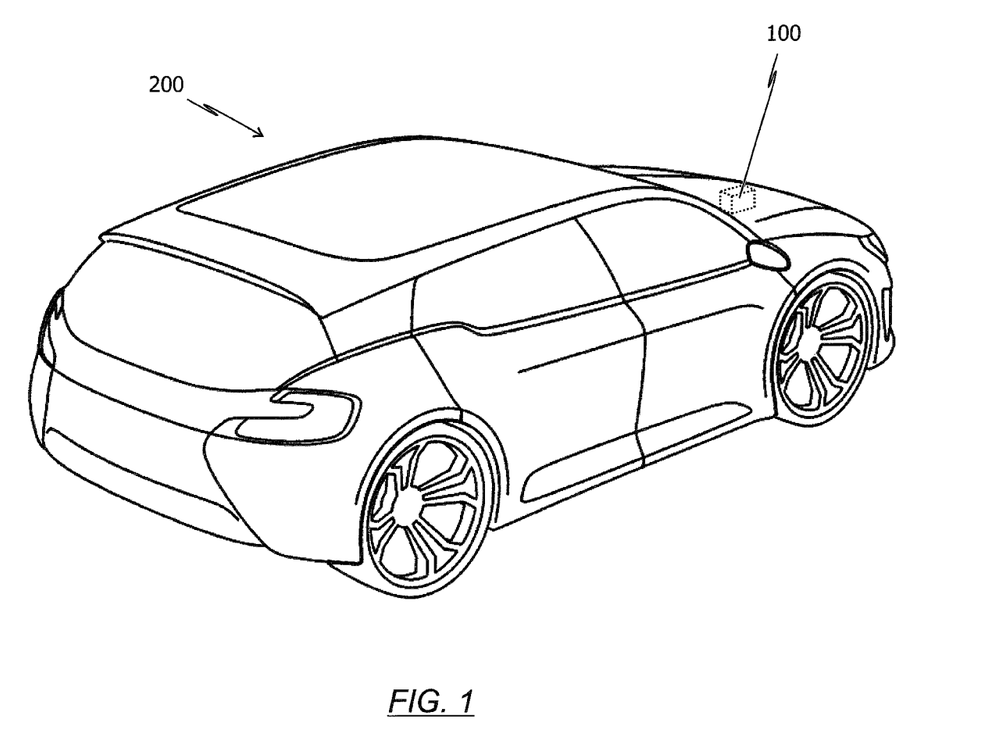
FIG. 1 shows a schematic illustration of a vehicle.

FIG. 1 shows a schematic illustration of a vehicle 200. In this case, the energy storage system 100 can be arranged in a region of the vehicle 200 that is at the front in the direction of travel, in a rear region of the vehicle 200 and/or in a region beneath the seats, in particular beneath the driver's seat.

The vehicle 200 can be an aircraft or watercraft, a rail vehicle, an all-terrain vehicle, or preferably a road vehicle, wherein a road vehicle can be understood to be a passenger car, a truck, a bus, or a motorhome.

Figure 2:
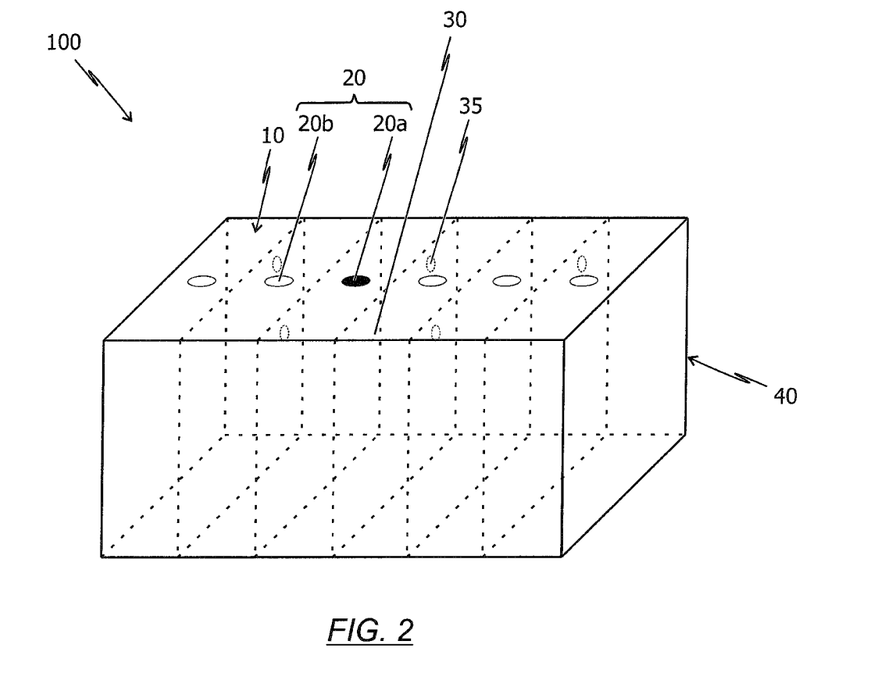
FIG. 2 shows a schematic illustration of an energy storage system of the present invention.

FIG. 2 shows a schematic illustration of an energy storage module 100 according to the invention. For greater clarity, individual elements, for example terminals of the energy storage system 100, the individual energy storage cells and the constituents thereof are not explicitly illustrated.

The energy storage system 100 according to the invention has a housing 40 made of a multiplicity of wall elements.

The wall elements delimit an interior of the housing 40, which is configured to accommodate a multiplicity of energy storage cells (not illustrated).

In order to make the interior of the housing 40 accessible for example for assembly and/or maintenance purposes, one wall element, in particular an upper wall element or cover element, of the housing 40 is configured such that the wall element is removable from the housing 40 and/or able to be connected thereto (in a sealing manner), such that the housing 40 can easily be opened and (tightly) closed.

The interior of the housing 40 is subdivided into individual chambers 10 by a multiplicity of dividing walls 30. Each chamber 10 is configured to accommodate an energy storage cell that belongs to the particular chamber 10.

According to the present invention, it is essential to create a fluidic connection, in particular a flow connection for gases, between the individual chambers 10 formed by the multiplicity of dividing walls 30. The fluidic connection between the individual chambers 10, which is in particular such that a common gas collecting space is formed in the interior, can be created in that each of the multiplicity of dividing walls 30 has at least one opening 35.

Each energy storage cell can in this case have a multiplicity of negative electrode plates, positive electrode plates, and separators, wherein the individual energy storage cells are connected together in series and/or parallel, in particular via busbars, which are ultimately connected to the terminals (not illustrated in the figures) of the energy storage system 100.

Via the terminals, electrical energy can be supplied to electrical consumers during a discharging operation or electrical energy can be supplied again to the individual energy storage cells during a charging operation, for example during a regenerative braking operation.

The energy storage cells can each be accommodated in a (gas-permeable) cell housing or directly (i.e. without an additional cell housing) in the individual chambers 10.

The housing 40 of the energy storage system 100 is usually initially open on one side, preferably on the top side, in order, during the assembly of the energy storage system 100, to receive optionally the dividing walls 30 and the energy storage cells in the chambers 10 thus formed.

The dividing walls 30 have in this case the at least one opening 35, on account of which the fluidic connection, or a flowing connection, between the individual chambers 10 is formed. In this connection, a fluidic connection can be understood to be a connection between the individual chambers 10 via which gas, gases and/or a gas mixture is in a flowing connection between the individual chamber 10, and in particular no liquids.

In this case, it is also possible for a membrane to be formed in at least one, in particular all, of the at least one opening 35, in particular a membrane that is permeable only to gas, gases and/or a gas mixture. This can advantageously prevent liquids, for example the electrolyte, from flowing from chamber 10 to chamber 10.

The at least one opening 35 can in this case already be directly formed during the production of the particular dividing wall 30; however, it can equally well be introduced into the dividing wall 30 after the latter has been produced.

The at least one opening 35 can in this case have any shape, for example the opening 35 can be formed in a round, rectangular, oval or square manner. The opening 35 can in this case have a cross-sectional area of approximately 20 mm$^2$ to 320 mm$^2$, preferably 75 mm$^2$ to 180 mm$^2$, particularly preferably 75 mm$^2$ to 80 mm$^2$. An opening 35 that is formed at least substantially in a round manner can in this case have for example a diameter of (approximately) 5 mm to 20 mm, preferably (approximately) 10 mm to 15 mm, particularly preferably 10 mm.

In this case, it may be advantageous for the at least one opening 35 to be arranged in an upper region of the dividing wall 30, since gas, gases and/or a gas mixture, for example oxygen, carbon dioxide, and/or hydrogen, collect in an upper region of the energy storage system 100 or in an upper region of each chamber 10.

However, it is also conceivable for at least one dividing wall 30 to have at least one opening 35 that is arranged at a lower level (as seen in a vertical direction) compared with at least one opening 35 in another dividing wall 30, which is arranged in an upper region. In particular such an opening 35 arranged at a lower level can have a membrane in order to ensure that only gases can diffuse through the opening, and no liquids.

In particular, the dividing walls 30 can be formed separately from the housing 40 and be introduced into the interior of the housing 40 in guide slots formed in an appropriate manner in the housing 40.

In particular, it is possible as a result for pre-existing or at least already partially manufactured housings 40 to be retrofitted easily and cost-effectively, specifically in that, rather than the conventional dividing walls, the dividing walls 30 according to the invention can be inserted into the interior of the housing 40. It is also possible for pre-existing (conventional) dividing walls to be easily retrofitted, by at least one opening 35 according to the invention being introduced (subsequently) into the dividing wall 30.

However, it is equally possible for the dividing walls 30 also to be formed integrally with the housing 40, for example during the production of the housing 40 in an injection-molding process.

In particular, to reduce production complexity, and to lower the production costs, a conventional housing is preferably used. In conventional energy storage systems, it has hitherto been necessary for each chamber to be vented separately or individually. Therefore, a vent opening is arranged in one wall element, in particular an upper wall element or cover element, of the housing 40, in each case in a region assigned to a corresponding chamber 10, said vent opening being designed to be closed (tightly) with the aid of a vent valve 20.

In conventional systems, it was absolutely necessary for each vent valve to be an active vent valve.

On account of the fluidic connection according to the invention that exists between the chambers 10, and thus on account of a common gas collection space, it is now necessary, according to the present invention, for only at least one active vent valve 20a to be used, this being illustrated in a manner filled in in black in the figures. The rest of the vent valves 20 can accordingly be in the form of blind plugs 20b. In the figures, blind plugs 20b are indicated by a circle that is not filled in. In particular, it may be desirable for at least one of the vent valves 20 to be a blind plug 20b.

In the embodiment illustrated in FIG. 2, each dividing wall 30 has exactly one opening 35.

In this case, two adjacent dividing walls 30 can be formed such that the particular opening 35 in the corresponding dividing wall 30 is arranged in a manner offset from another opening 35 in another dividing wall 30. Preferably, the particular openings 35 are arranged in an upper end region or in one of the two upper corner regions of the particular dividing wall 30. Such an arrangement promotes equalization or exchange of the gas, gases and/or gas mixture and can avoid a situation in which a "dead corner" forms in which gas backs up or accumulates.

Figure 3:
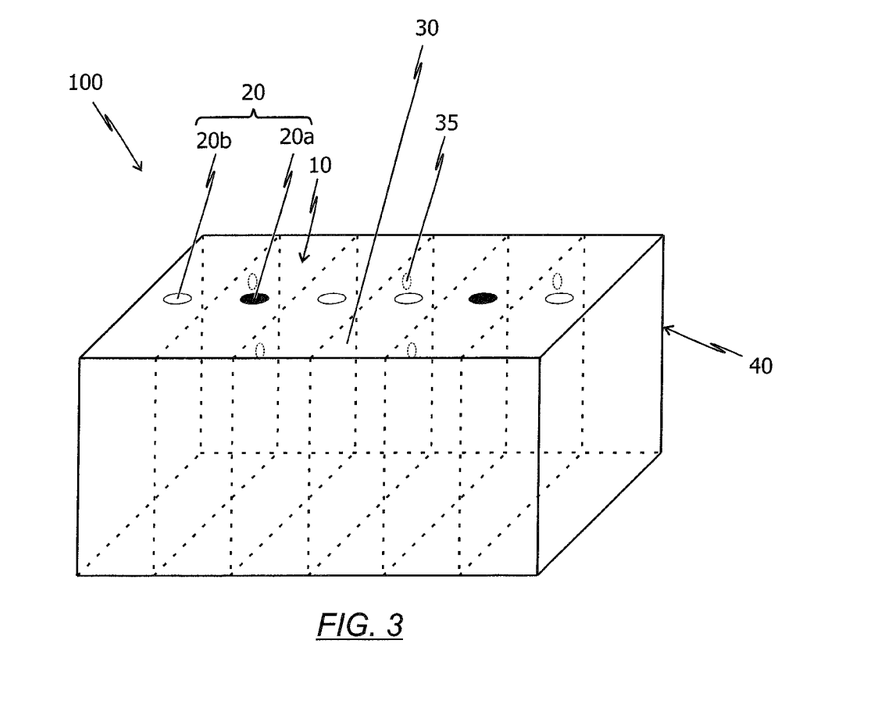
FIG. 3 shows a schematic illustration of the energy storage system of the present invention.

It is also possible for the openings 35 per dividing wall 30 to be arranged in an alternately offset manner, as illustrated for example in FIGS. 2 and 3. Such an alternately offset arrangement of the one opening 35 can advantageously also result in easier assembly and production, this in turn lowering the costs. Thus, it is possible for example for two identical dividing walls 30 to be introduced into the housing 40 such that one dividing wall 30 is turned through 180° (about an axis parallel to the introduction direction) compared with the other dividing wall.

However, the one opening 35 in at least one dividing wall 30 can equally well be arranged in a central, in particular upper, region of the particular dividing wall 30.

In this case, it is conceivable for all the dividing walls 30 to have the one opening 35 in a central, in particular upper, region. However, it is equally conceivable for only at least one dividing wall 30 to have the one opening 35 in a central, in particular upper, region, wherein at least one dividing wall 30 does not actually have the at least one opening 35 in a central upper region.

In the embodiment illustrated in FIG. 2, the further wall element, in particular the cover element, of the housing 40 has exactly one active vent valve 20a, which is preferably assigned to a central chamber 10.

Of course, it is equally possible for the active vent valve 20a to be able to be assigned to a different chamber 10.

As illustrated in FIG. 3, it is possible, for example in the case of energy storage systems 100 with high gas emission, for a further (additional) redundant vent valve 20 to be in the form of an active vent valve 20a, i.e. the further wall element, in particular the cover element, of the housing 40 has two active vent valves 20a.

The two active vent valves 20a are in this case assigned preferably to chambers 10 that are separated from one another by at least one chamber 10 to which a blind plug 20b is assigned.

Figure 4:
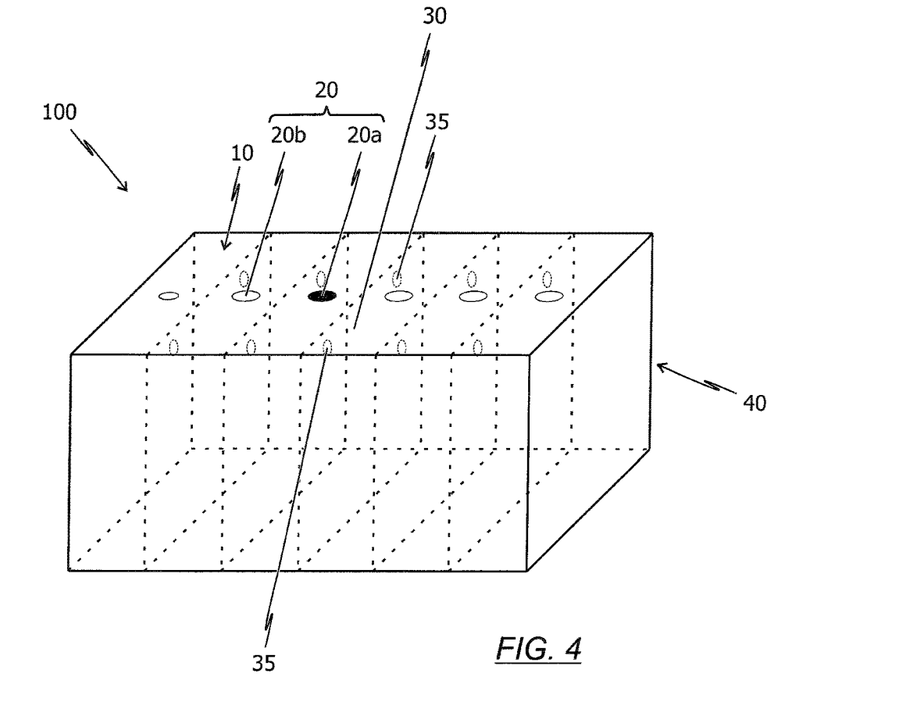
FIG. 4 shows a schematic illustration of an energy storage system according to one aspect of the present invention.

FIG. 4 shows an example of an energy storage system 100 according to the invention in which exactly one active vent valve 20a is arranged in the further wall element, in particular the cover element, of the housing 40. In order to improve gas circulation between the chambers, the multiplicity of dividing walls 30 have two spaced-apart openings 35. In particular, the two openings 35 are arranged in an upper region of the particular dividing wall 30, preferably in two upper end regions or in the two upper corner regions of the dividing wall 30.

Figure 5:
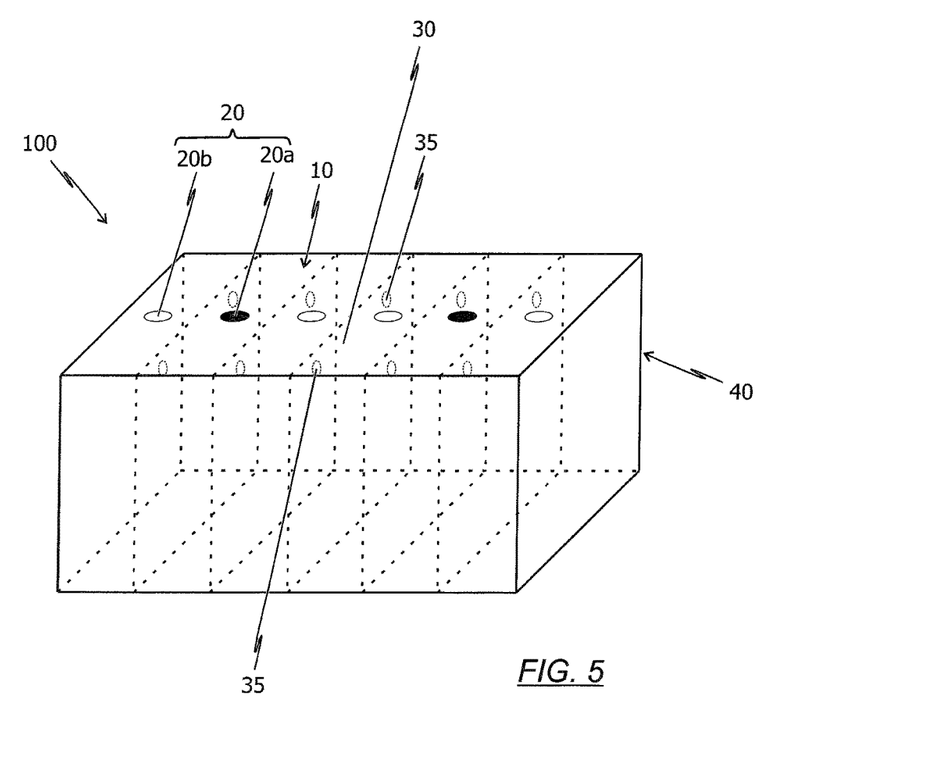
FIG. 5 shows a schematic illustration of a development of the energy storage system according to FIG. 4.

FIG. 5 shows an example of an energy storage system 100 according to the invention, in which, for example, on account of high gas emission, the further wall element, in particular the cover element, of the housing 40 has two active vent valves 20a. The multiplicity of dividing walls 30 also have, according to the illustration in FIG. 5, two spaced-apart openings 35. In particular, the two openings 35 are arranged in an upper region of the particular dividing wall 30, preferably in the two outer, upper end regions.

Although not explicitly illustrated in the figures, it is not necessary for all the dividing walls 30 to have exactly one opening 35 or exactly two openings 35. Rather, it is possible for one or more dividing walls 30 to have exactly one opening 35, while the rest of the dividing walls 30 have two or more openings 35.

It is also conceivable, in the event that all the dividing walls 30 have exactly one opening 35, for these to be arranged alternately in a first upper region or in a first upper corner region, in a central upper region, and/or in a second upper region or in a second upper corner region of the dividing walls 30.

It is also conceivable for a membrane to be formed in at least one of the openings 35, in particular in each opening 35, said membrane selectively letting through only gases or gas mixtures, preferably oxygen, carbon dioxide and/or hydrogen, but no liquids.

It is equally conceivable for at least one dividing wall 30 to have no opening and for at least one dividing wall 30 to have at least one opening, such that at least two mutually separated (sealed) gas collection spaces are formed. In this case, at least one active vent valve 20a has to be provided for each gas collection space formed in this way.

For example, in the case of an energy storage system 100 having a total of six chambers 10, the central dividing wall 30 can be formed without an opening 35, while the rest of the dividing walls 30 have at least one opening 35. In this way, two gas collection spaces are formed over in each case three chambers 10. Each gas collection space has to be assigned at least one active vent valve 20a. For example, exactly one active vent valve 20a and two blind plugs 20b are assigned to each of the two gas collection spaces, wherein the vent valves 20 are arranged as desired.

According to the present invention, the active vent valves 20a are preferably in the form of one-way valves having a predetermined or predeterminable venting pressure, wherein, in this case, the one-way valve is integrated preferably in a vent plug.

The energy storage system 100 according to the invention can in this case be in the form of a valve-regulated lead-acid battery. It is also possible for the energy storage system 100 to be in the form of a valve-regulated absorbent glass mat (AGM) lead-acid battery, in which the electrolyte is incorporated into the glass mat.

At this point it should be noted that all the parts described above, viewed on their own and in any combination, in particular the details illustrated in the drawings, are claimed as essential to the invention. Modifications thereof are familiar to a person skilled in the art.

LIST OF REFERENCE SIGNS

10 Chamber
20 Vent valves
20a Active vent valve
20b Blind plug
30 Dividing wall
35 Opening
40 Housing
100 Energy storage system
200 Vehicle

The invention claimed is:
1. An energy storage system for a vehicle, wherein the energy storage system is a lead-acid battery and comprises:
  a multiplicity of energy storage cells for providing and/or storing electrical energy;
  a housing that has a multiplicity of wall elements that bound an interior of the housing, wherein the housing is configured to accommodate the multiplicity of energy storage cells in the interior of the housing;
wherein a multiplicity of dividing walls for subdividing the interior of the housing into a multiplicity of chambers are arranged in the interior of the housing, wherein each chamber is configured to accommodate a respective one of the multiplicity of energy storage cells, wherein a fluidic connection is formed between the individual chambers, and wherein a vent valve is arranged on and extending through a cover element of the housing in each case in a region assigned to a corresponding chamber, wherein at least one of the vent valves is an active vent valve and the rest of the vent valves are blind plugs, and wherein at least one of the vent valves is in the form of a blind plug.

2. The energy storage system as claimed in claim 1, wherein exactly one active vent valve is arranged on the cover element of the housing such that the active vent valve is assigned to a chamber that is arranged in a central region of the interior of the housing.

3. The energy storage system as claimed in claim 1, wherein two active vent valves are arranged on the cover element of the housing such that the two active vent valves are assigned to two chambers that are separated from one another via at least one chamber that is assigned a blind plug.

4. The energy storage system as claimed in claim 1, wherein each dividing wall has at least one opening for forming the fluidic connection between the individual chambers.

5. The energy storage system as claimed in claim 4, wherein at least one of the multiplicity of dividing walls has in each case exactly one opening in an upper region of the corresponding dividing wall.

6. The energy storage system as claimed in claim 5, wherein the one opening per dividing wall is arranged such that at least two adjacent dividing walls have the opening in an offset manner.

7. The energy storage system as claimed in claim 5, wherein at least one dividing wall has the one opening in an upper, central region of the corresponding dividing wall.

8. The energy storage system as claimed in claim 4, wherein at least one of the multiplicity of dividing walls has in each case exactly two openings in an upper region of the particular dividing wall.

9. The energy storage system as claimed in claim 2, wherein a membrane is formed in at least one of the openings.

10. The energy storage system as claimed in claim 1, wherein the active vent valve is in the form of a one-way valve with a predetermined or predeterminable venting pressure.

11. The energy storage system as claimed in claim 1, wherein the blind plugs are in the form of vent plugs, which are configured to seal off the interior of the housing.

12. The energy storage system as claimed in claim 1, wherein the energy storage system is in the form of a valve-regulated lead-acid battery.

13. The energy storage system as claimed in claim 5, wherein all of the dividing walls have in each case exactly one opening in an upper region of the corresponding dividing wall.

14. The energy storage system as claimed in claim 6, wherein the one opening per dividing wall is arranged such that at least two adjacent dividing walls have the opening in an alternately offset manner.

15. The energy storage system as claimed in claim 14, wherein the one opening per dividing wall is arranged such that at least two adjacent dividing walls have the opening in the alternating offset manner in the two upper end regions of the dividing walls.

16. The energy storage system as claimed in claim 7, wherein all of the dividing walls have the one opening in an upper, central region of the corresponding dividing wall.

17. The energy storage system as claimed in claim 8, wherein all of the dividing walls have in each case exactly two openings in an upper region of the corresponding dividing wall.

18. The energy storage system as claimed in claim 17, wherein the two openings are arranged in each case in two upper end regions of the corresponding dividing wall.

19. The energy storage system as claimed in claim 10, wherein the one-way valve is integrated into a vent plug.

20. A lead-acid battery comprising:
a multiplicity of energy storage cells of the lead-acid type to provide and store electrical energy;
a housing comprising:
a multiplicity of wall elements and a cover element, all of which bound an interior of the housing, accommodating the multiplicity of energy storage cells in the interior of the housing; and
a multiplicity of dividing walls to subdivide the interior of the housing into a multiplicity of chambers arranged in the interior of the housing, each chamber accommodating a respective one of the multiplicity of energy storage cells, and each dividing wall defining a respective fluidic connection between adjacent chambers of the each dividing wall; and
a multiplicity of vent valves arranged on and extending through the cover element of the housing, each vent valve of the multiplicity vent valves corresponding to a respective chamber of the multiplicity of chambers, in each case in a region assigned to the respective chamber, wherein
at least one of the vent valves is an active vent valve and the rest of the vent valves are blind plugs, and
at least one of the vent valves is in the form of a blind plug.

* * * * *

UNITED STATES PATENT AND TRADEMARK OFFICE
CERTIFICATE OF CORRECTION

PATENT NO. : 11,417,931 B2
APPLICATION NO. : 16/612278
DATED : August 16, 2022
INVENTOR(S) : Abderrezak Hammouche et al.

Page 1 of 1

It is certified that error appears in the above-identified patent and that said Letters Patent is hereby corrected as shown below:

On the Title Page

1. In Item (57), under "ABSTRACT", in Column 2, Line 10, delete "receiving" and insert -- receive --, therefor.

In the Specification

2. In Column 5, Line 52, delete "particular all," and insert -- particular all --, therefor.

In the Claims

3. In Column 8, Line 60, in Claim 1, delete "energy;" and insert -- energy; and --, therefor.

4. In Column 9, Line 43, in Claim 9, delete "claim 2," and insert -- claim 4, --, therefor.

Signed and Sealed this
Ninth Day of April, 2024

Katherine Kelly Vidal
*Director of the United States Patent and Trademark Office*